Ralph A. Van Eaton Inventor

Patented June 30, 1931

1,812,841

UNITED STATES PATENT OFFICE

RALPH A. VAN EATON, OF CORONA, NEW YORK, ASSIGNOR TO STANDARD OIL DEVELOPMENT COMPANY, A CORPORATION OF DELAWARE

INTERNAL COMBUSTION ENGINE AND METHOD OF OPERATING THE SAME

Application filed May 6, 1926. Serial No. 107,133.

This invention relates to improvements in internal-combustion engines and methods of operating the same. The invention has particular reference to the supply of air, with or without admixture with combustible material, water, or anti-knock agent, to the cylinder or cylinders of the engine.

Figure 1:
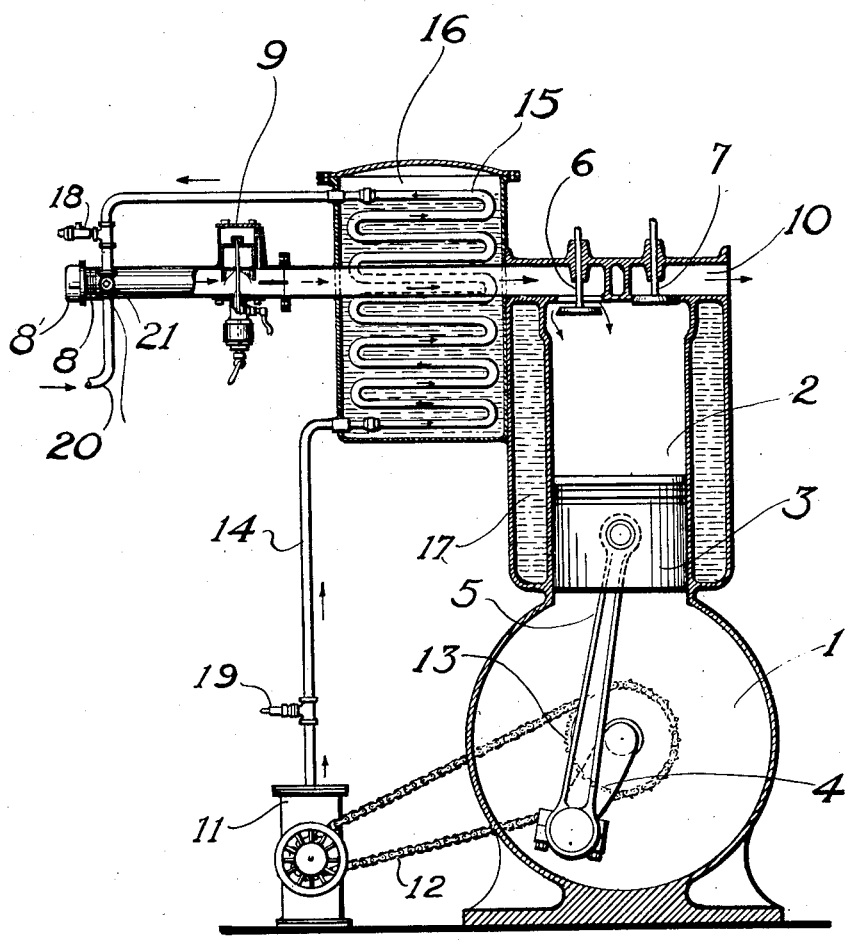
Figure 2:
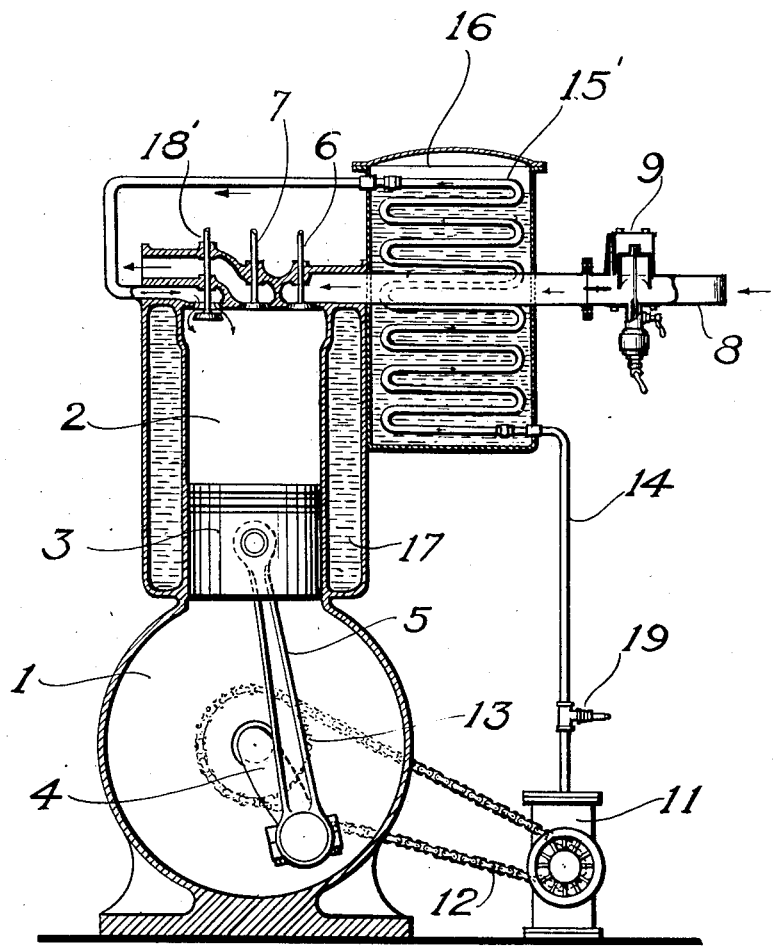

The invention will be fully understood from the following description and the accompanying drawings, in which Fig. 1 is a longitudinal section through an internal-combustion engine, showing one form of my invention; and Fig. 2 is a similar view showing an alternative form.

The embodiment illustrated in Fig. 1 comprises an internal-combustion engine having a crank-case 1, a cylinder 2, a piston 3, reciprocable in the cylinder and operating the usual crank-shaft 4 by means of a connecting rod 5. An inlet valve 6 and an exhaust valve 7 are operated by the customary cam mechanism (not shown), or in any other suitable way.

The inlet valve 6 controls the air intake conduit 8, which is connected to the carburetor 9, or other similar device for mixing a fluid with the incoming air to form the combustible charge for the engine. The exhaust valve 7 controls the inlet to the exhaust conduit 10.

In accordance with my invention, an air compressor 11, or similar source of compressed air, is driven as by means of the chain 12, which passes over the sprocket wheel 13 on the crank-shaft 4. The compressor delivers air through the pipe 14 into a cooling chamber which may advantageously take the form of a pipe coil 15. This coil is arranged in the container 16, which is cooled by the water supplied from the same source as that supplied to the engine jacket 17. I consider this form of cooling to be the most convenient, but other cooling means may be used.

The coil 15 discharges into the intake conduit 8 beyond the carburetor 9, as shown. The intake conduit 8 in this embodiment of the invention is preferably closed at its outer end by a pipe cap 8', so that all the air for the engine cylinder is supplied through the cooling coil. A reducing valve 18 is arranged in the outlet from the cooling coil adjacent the intake conduit. This valve is set to permit the desired amount of air to pass through it. The pressure may be reduced to substantially atmospheric. In this way the air is cooled, not only be heat exchange in the container 16, but by expansion through the valve 18. A very material reduction in the temperature of the air results. The carbureter will be so adjusted as to supply an adequate amount of fuel, notwithstanding the decrease in fuel-volatility due to the cooling of the air. The pressure developed in the cooling coil may be limited by a safety valve 19, arranged in the pipe 14.

The cooled air is drawn through the carbureter by the suction of the engine, and the carbureted mixture is compressed in the engine cylinder on the upstroke of the piston. The engine may operate on the Otto cycle or on any other desired cycle. The maximum temperature reached on the compression stroke will be considerably less than if the air had been drawn in at normal temperature. The relatively low temperature of the charge tends to prevent knocking or detonation, even in engines having a high compression ratio.

A pipe 20, open to the atmosphere at its outer end, is connected through a valve 21 with the pipe 15 and the intake conduit 8. The valve 21 may be rotated to cause all the air to enter through either pipe 15 or pipe 20, or part through each. A suitable control (not shown) enables the operator to regulate valve 21. Some times it may be desirable not to cool the charge, as for example in starting the car in cold weather. In such cases the valve 21 may readily be actuated to regulate or shut off the supply of cooled air.

Alternatively, as shown in Fig. 2, the cooled air may be introduced into the engine cylinder without passing through the carbureter. In this case normal air will be drawn from the atmosphere through the carbureter in the ordinary manner, to supply the main combustible mixture. The carbureter will be adjusted to provide a mixture rich enough for efficient combustion, utilizing some or all of the cooled auxiliary air received from the cooling coil 15'.

In Fig. 2 the construction is the same as in Fig. 1, except that a cooling coil 15' discharges auxiliary air through the valve 18' directly into the engine cylinder 2. The valve 18' is actuated from the cam shaft to open at a point on the compression stroke substantially before ignition. Ordinarily, the valve will be timed to open at the middle portion of the compression stroke or thereabouts. The valve should be timed to close at or about the ignition point. The highly compressed cooled air passing into the cylinder reduces the temperature therein during the latter part of the stroke. This procedure tends to prevent knocking. When the air pressure is greater than the cylinder pressure, the air expands into the cylinder, furnishing further cooling. The extent of cooling necessary for best results will vary with the particular type of engine and fuel used. Usually, cooling to such an extent that the compression is similar to isothermal is satisfactory. The results obtained by direct injection of cooled air on the compression stroke are similar to those obtained when the whole charge is cooled.

There is an additional advantage in the arrangement shown in Fig. 2, in that it is possible to supercharge the cylinder to any desired extent. The amount of supercharging will depend upon the pressure developed by the compressor, which may in turn be regulated by adjusting the valve 19. Supercharging may also be accomplished by passing the cooled air through the carbureter and thence directly into the cylinder.

The procedure and apparatus described above are illustrative only, and various changes may be made within the scope of the appended claims, in which it is my intention to claim all novelty inherent in the invention as broadly as the prior art permits.

I claim:

1. In combination with an internal combustion engine having a cylinder, a reservoir for compressed air, means for compressing air into said reservoir, means for cooling the compressed air in said reservoir, a communication between said reservoir and said engine cylinder, a valve for controlling said communication, means for opening said valve to introduce some of the compressed air from said reservoir directly into the cylinder and a relief valve to permit the remainder of the compressed air to escape, thus further cooling by expansion that introduced into the cylinder.

2. In combination with an internal combustion engine having a cylinder, a reservoir for compressed air, means for compressing air into said reservoir, means for cooling the compressed air in said reservoir, a communicaton between said reservoir and said engine cylinder, a valve for controlling said communication, means for opening said valve during the compression stroke of the engine to introduce some of the compressed air from said reservoir directly into the cylinder and a relief valve to permit the remainder of the compressed air to escape, thus further cooling by expansion that introduced into the cylinder.

RALPH A. VAN EATON.